United States Patent Office 3,714,063
Patented Jan. 30, 1973

3,714,063
METHOD AND COMPOSITION FOR EMULSIFYING PETROLEUM PRODUCTS WITH A VIEW TO PREPARING A CULTURE MEDIUM FOR MICROORGANISMS
Georges Henri Salomone, 14 Avenue Pierre ler de Serbie, Paris, France
No Drawing. Filed Jan. 29, 1971, Ser. No. 111,104
Claims priority, application France, Feb. 3, 1970, 7003765
Int. Cl. B01j *13/00*
U.S. Cl. 252—312     1 Claim

ABSTRACT OF THE DISCLOSURE

Petroleum products are rendered bio-degradable to produce fertilizer, by admixing therewith, per 100 parts by weight of petroleum product, 40 to 1000 parts by weight of a mixture which is 20% to 50% by weight of a carbohydrate or protein nutrient for the micro-organisms, 30% to 50% by weight of an organic acid, and 0% to 30% by weight of alkali or alkaline earth salt.

---

The present invention is concerned with a method and a composition for emulsifying petroleum products with a view to preparing a culture medium for micro-organisms.

The sludges and deposits coming from crude oils and their derivatives pose important and serious technical and economic problems. These sludges and deposits fluidify only with difficulty in steam and this operation requires a considerable amount of manual labour with high prime costs. The use of solvents and the rejection of the sludge fluidified in steam causes unceasing pollution of water with harmful effects on the flora and fauna by virtue of the very slow rate of degradation of the said hydrocarbons.

In the U.S. Pat. No. 3,609,096, Sept. 28, 1971, a product has already been proposed, which is constituted by a strong mineral acid, an alkaline or alkaline-earth salt and an organic, hydrophile substance, particularly molasses. This product contains from 30 to 70% of a strong mineral acid and it has a strongly acid pH which does not exceed 1.8. The diluted emulsion obtained with this product is not toxic to flora and fauna.

In the U.S. patent application filed on the same day as the present for a "Method and Composition for the Emulsification and Degradation of Petroleum Products and Fertilizers Thus Obtained" there has been described an aqueous composition to emulsify and transform into culture medium for micro-organisms, petroleum products, said composition being constituted by carbohydrates and a substance reducing surface tension, said substance chosen mainly from the alkaline or alkaline-earth silicates, carbonates and phosphates. This composition has an essentially basic character.

The aim of the invention is to make petroleum wastes of all types undergo a treatment transforming them into a culture medium for micro-organisms in such a manner as to permit their rapid degradation by the latter.

It has as its subject a composition for the emulsification of petroleum products, the emulsion constituting a very good culture medium of low prime cost for the industrial culture of numerous micro-organisms. This composition comprises a substance capable of ensuring the nutrition of the micro-organisms chosen from the carbohydrates and the proteins and an organic acid. The composition can also contain an alkaline or alkaline-earth salt, particularly in the case where it is necessary to control the pH of the final emulsion used as culture medium for micro-organisms. There can be contingently added to the composition a small percentage, not exceeding 10%, of a strong mineral acid.

The percentages of the different constituents can vary as a function of the nutritional value and of the specific activity of the substance used.

In a general way the composition, which is the subject of the invention, corresponds to the following composition limits:

Parts by weight
Substance ensuring the nutrition of the micro-
   organisms (carbohydrates or proteins) _____ 20 to 50
Organic acid _____ 30 to 50
Alkaline or alkaline-earth salt _____ 0 to 30

Carbohydrates or proteins alone or in a mixture such as of molasses, cellulose, sugar beet wastes, casein, malt extracts, proteoses etc. can be used as substance ensuring the nutrition of the micro-organisms.

The organic acid can be chosen from the acids of low prime cost and obtainable commercially, particularly lactic, acetic, citric, gluconic, glutamic, itaconic and oxalic acids. These acids can be in the pure form or in the form of industrial wastes such as cheese factory serum, brewery mash, fermentation residues from the production of citric, glutamic acid, etc.

The alkaline or alkaline-earth salt can be a non toxic salt reducing surface tension and contingently chosen as a function of the nature of the micro-organism to be cultivated. In particular calcium, sodium, ammonium or potassium, silicates, sulphates, sulphites, hyposulphites, carbonates, phosphates, phosphites, chlorides, nitrates, nitrites, lactates, acetates, oxalates, glutamates and citrates can be used. These salts can be in the pure form or contained in industrial wastes.

The present invention also has as its subject a method of emulsifying petroleum wastes and ensuring the formation of a culture medium for micro-organisms characterized in that there is mixed with 100 parts by weight of the said wastes, from 40 to 1000 parts by weight of a composition such as above and then diluted with water. The dilution is of the order of 1 to 30 times.

The invention also has as its subject a culture medium for micro-organisms constituted by the above emulsion to which can be added elements which can be attacked by the micro-organisms cultivated such as metal salts or oxides, particularly in the form of poor minerals. This culture medium can be used for the industrial culture of micro-organisms such as edible yeasts intended for human dietetics or animal nutrition, bacteria, or fungi intended for the manufacture by fermentation of certain products such as citric acid, gluconic acid, glutamic acid, etc. or bacteria or fungi attaching minerals for example the silico-bacteria liberating potassium from natural silicates, thio-bacteria producing sulphuric acid starting from reduced sulphur products, the sulphato-reducing bacteria producing sulphur starting from sulphates and sulphites and the various micro-organisms used for the metal enrichment of minerals with low content as well as to assist the bio-degradation of substances which are difficult to attack.

The culture media can, after partial or total degradation, be used as fertilizer or as base constituents for fertilizers. There can be added to the fertilizing elements such as potash, sulphates, phosphates, nitrates, etc. These fertilizing elements can be added to the composition or to the emulsion if they are not harmful to the development of the micro-organisms.

There will be given hereinafter by way of non-limitative examples, different ways of putting the invention into practice.

EXAMPLE 1

A composition constituted by:

| | Parts by weight |
|---|---|
| Molasses | 80 |
| Lactic acid | 100 |
| Dicalcium phosphate | 60 | was prepared.

To 100 parts by weight of petroleum residues were added 120 parts by weight of the above composition and the mixture was stirred with the addition of 15 times its volume of water. The emulsion was poured into a ten-litre fermenter and innoculated with one gram of yeast of *Terulopsis utilis* stock. The yeast developed and after 10 hours, it was possible to recover an amount of yeast equal to about 50% of the weight of the molasses used. A check by chromatography in the gaseous phase showed a notable degradation of the hydrocarbons. The culture medium was used as fertilizer.

EXAMPLE 2

A composition constituted by:

| | Parts by weight |
|---|---|
| Casein | 30 |
| Lactic acid | 100 |
| Dicalcium phosphate | 80 | was prepared.

The composition was used in same manner as in Example 1 at the rate of 100 parts by weight of the composition for 100 parts by weight of hydrocarbons and it constituted in the same conditions an excellent culture medium for yeast.

EXAMPLE 3

A composition comprising:

| | Parts by weight |
|---|---|
| Molasses | 30 |
| Lactic acid | 100 |
| Potassium phosphate | 20 |
| Sulphate in the form of gypsum | 40 | was prepared.

The composition was used to emulsify crude oil at the rate of 200 parts by weight of the composition for 100 parts by weight of the petroleum wastes and 5000 parts by weight of water.

The emulsion placed in a fermenter in an anaerobic state served as culture medium for *Vibrio desulfuricans*. After 4 weeks the transformation of the calcium sulphate into sulphur was ascertained, the production of precipitated sulphur corresponding to 42% of the sulphur contained at the beginning in the form of sulphate.

EXAMPLE 4

The same composition as in Example 1 was prepared, but replacing the lactic acid by the same quantity, by weight, of acetic acid. This composition was used in the same manner and under the same conditions with, however, an increase in the percentage of the composition for the emulsification of petroleum residues. The emulsion obtained, greatly diluted, was used as fertilizer for a micaceous sand. After having been inoculated with silicobacteria and left at rest for six months, the soil showed an enrichment in potassium liberated from the mica. It was sown with cereal which sprouted normally without any deficiency in phosphate, calcium or potassium.

EXAMPLE 5

In the composition in accordance with Example 4, the 80 parts by weight of molasses are replaced by 60 parts by weight of peptone. Three tonnes of the composition were used to emulsify an equivalent weight of bunker hydrocarbon residues with the addition of 10 volumes of sea water. The emulsion was discharged in a port environment without any modification of the flora or fauna and without any petroleum deposit on the jetties.

EXAMPLE 6

With a composition comprising:

| | Parts by weight |
|---|---|
| Lactic acid | 100 |
| Molasses | 80 |

80 parts by weight of crude oil were emulsified with the addition of 5000 parts by weight of soft water. There was added to the emulsion 100 parts by weight of natural manganese dioxide and this was inoculated with a *Cladosporium herbarum* fungus. After 30 days in a fermenter with stirring and suitable aeration, 20% of the magnanese was found solubilized in the culture medium and 0.7% thereof had accumulated in the mycelium. The separation was effected by filtration.

EXAMPLE 7

The following composition was prepared:

| | Parts by weight |
|---|---|
| Casein | 30 |
| Lactic acid | 10 |
| Dairy serum | 90 |
| Natural calcium sulphate (anhydrite) | 30 |

20 parts by weight of crude oil were emulsified in this composition and, after dilution, there was cultivated in this medium in an anaerobic state *Vibrio desulfuricans* inoculated with five millilitres of a fresh culture of *Vibrio desulfuricans* per ten litres of solution. After five weeks the sulphur precipitated in consequence of the transformation of the calcium sulphate corresponded to 40% of the sulphur contained at the beginning in the form of sulphate.

EXAMPLE 8

A composition containing:

| | Parts by weight |
|---|---|
| Molasses | 90 |
| Lactic acid | 40 |
| Calcium sulphite | 60 |
| Phosphoric acid | 20 | was prepared.

100 parts by weight of this composition were used to emulsify 100 parts by weight of petroleum residues and the emulsion was diluted to 15 times its volume with water. The emulsion was inoculated in a fermenter with thiobacteria. 70% of the sulphur contained in the calcium sulphite was transformed into sulphuric acid which was recovered by elimination of the solid material by filtration and concentration of the filtrate.

The embodiments described above by way of examples are capable of having numerous modifications made to them without departing from the scope of the present invention.

What is claimed is:

1. A method of accelerating the biodegradation of petroleum products by micro-organisms selected from the group consisting of yeast, bacteria and fungi, comprising mixing 100 parts by weight of the petrolum product to be biodegraded with 40 to 1000 parts by weight of a composition consisting essentially of 20 to 50 parts by weight of a substar e for nourishing microorganisms and selected from the group consisting of molasses, cellulose, sugar beet waste, casein, malt extract and proteose, 30 to 50 parts by weight of an organic acid selected from the group consisting of lacetic, acetic, citric, gluconic, glutamic, itaconic and oxalic, and 0 to 30 parts by weight of a salt whose cation is selected from the group consisting of calcium, sodium, ammonium and potassium and whose anion is selected from the group consisting of silicate, sulphate, sulphite, hyposulphite, chloride, nitrate, nitrite, lactate, acetate, oxalate, glutamate and citrate, and forming an emulsion of the mixture thus produced with water in a substantial amount up to 30 times by weight of the mixture.

References Cited

Berkman et al. Emulsions and Foams, Reinhold Pub. Co. (1941), pp. 171–72, 178–184.

JOHN D. WELSH, Primary Examiner

U.S. Cl. X.R.

195—3 H; 210—11; 252—352; 71—6